Patented Mar. 29, 1927.

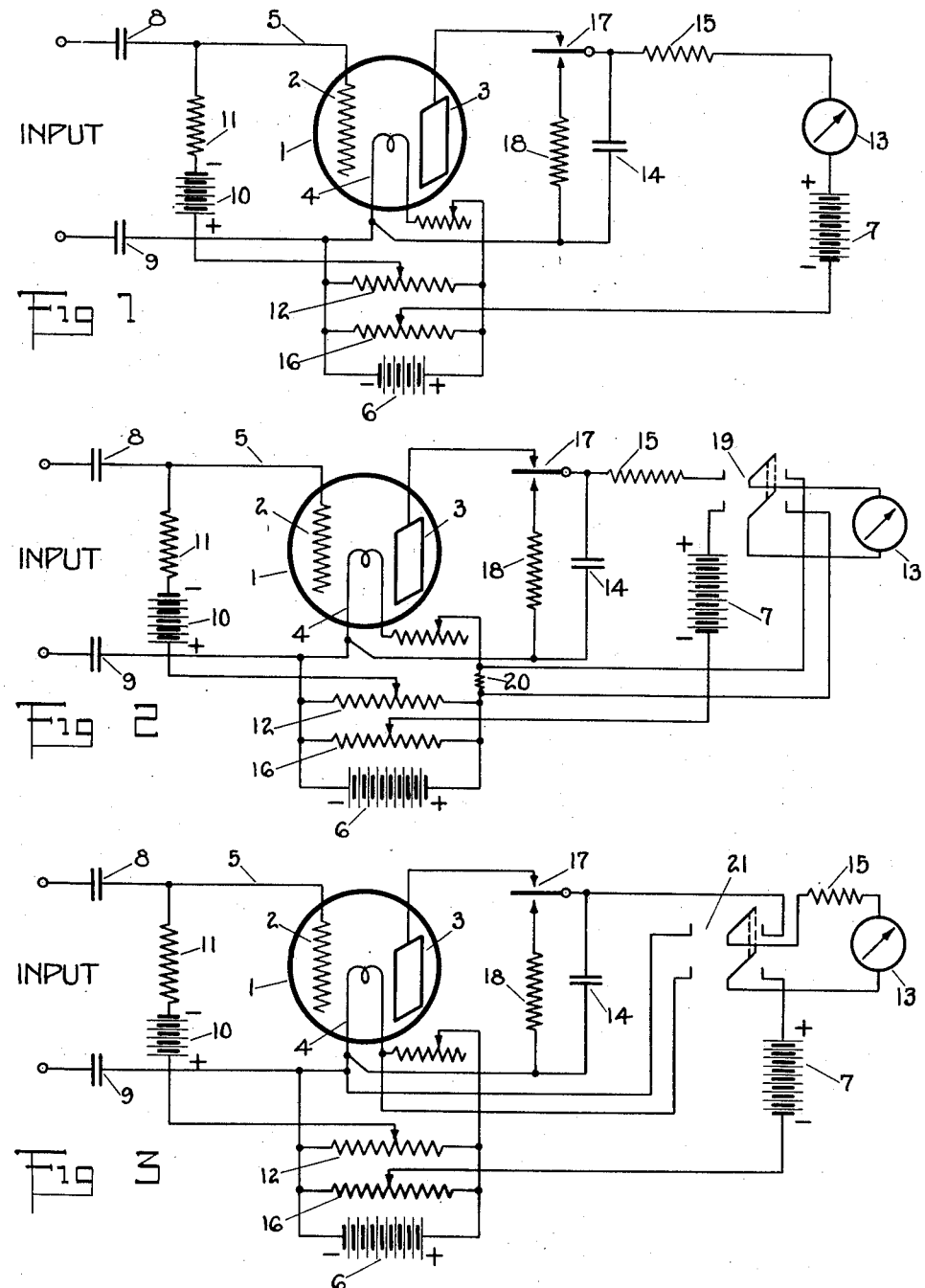

1,622,786

UNITED STATES PATENT OFFICE.

LAWRENCE C. F. HORLE, OF NEWARK, NEW JERSEY, ASSIGNOR TO FEDERAL TELEPHONE MANUFACTURING CORPORATION, OF BUFFALO, NEW YORK, A CORPORATION OF NEW YORK.

VACUUM-TUBE VOLTMETER.

Application filed June 27, 1925. Serial No. 40,055.

The invention relates to measuring apparatus of the vacuum tube type, for the measuring of small voltages over a wide range of frequencies. More particularly it relates to means for maintaining the vacuum tube circuits employed in the voltmeter system in the proper condition of calibration.

In the testing of radioequipment and in the investigation of phenomena existing in radio and similar apparatus, means are required for the measurement of voltages and currents of exceedingly complex wave form. The measuring means must absorb very little power in its operation, since in many cases only minute amounts of power are available, and said means must have characteristics which make its indications independent of frequency. These conditions are most nearly met by the vacuum tube because of its rectifying properties and its exceedingly high input impedance. In a voltage measuring system employing the vacuum tube, the voltage to be measured is applied to the input terminals of the tube. Since the relation between plate current and grid potential relative to the filament is straight line over only a short portion of the characteristic, the application to the grid circuit of an alternating voltage the amplitude of which exceeds the straight line portion of the characteristic will result in a change of plate direct current. The difference between the plate current with and without the applied grid circuit voltage is then a measure of the magnitude of this voltage. Such a system requires accurate calibration, but when once calibrated allows of the measurement of voltages of a wide range of frequency and requires a practically immeasurably small amount of power for its operation. Difficulties, however, have been encountered in the use of the vacuum tube as part of a voltage measuring system, due to the fact that when variations occur in the voltages particularly of the plate battery and of the grid biasing battery, the calibration of the detector is completely destroyed. It is only by maintaining these voltages, during the measuring operation, at precisely the proper calibration values that the device can be used with any degree of precision. As a corrective of this difficulty, it has been suggested that a voltmeter of usual type be included in the vacuum tube measuring system, for the measurement of the plate voltage and the grid biasing voltage, and that means also be included for the adjustment of these voltages and for their maintenance at predetermined calibration values. This scheme has been found impracticable. Voltmeters which might conceivably be used for this purpose are in fact useless, because of their comparatively low resistances as compared with the resistances involved in the circuits associated with the voltage measuring device.

It is the general object of the invention to provide a simple and inexpensive voltage measuring instrument of the vacuum tube type by which exact measurements of voltages of varying magnitude and wave forms and over a wide range of frequencies may readily be made.

A further object is the provision of an improved vacuum tube voltmeter system in which the calibration difficulties heretofore encountered are overcome and in which the maintenance of the tube detector in the proper condition of calibration is easily accomplished without the use of complicated and expensive measuring apparatus, and with a required minimum of time and skill in the calibration process.

In accordance with the invention I provide regulating means for plate and grid circuits, and resistance means comprised in a dummy plate circuit, said voltage regulating means and resistance means being arranged for coaction with calibration indicating means in the form of a sensitive measuring instrument already included in the apparatus for the purpose of indicating the voltages to be measured by said apparatus.

For a clearer understanding of the invention reference is made to the following description and to the accompanying drawings.

Fig. 1 is a diagrammatic view of an embodiment of the invention.

Fig. 2 is a diagrammatic view similar to that of Fig. 1 and showing a modification of the invention.

Fig. 3 is also a diagrammatic view showing a further modification of the invention.

The same reference character refers to the same part throughout the figures.

Referring to Fig. 1, a vacuum tube 1 comprises grid 2, anode element such as plate 3 and cathode element such as filament 4.

Grid 2 is included in an output circuit 5 to the terminals of which may be applied voltages to be measured by the instrument. Filament heating current is supplied from a current source as battery 6, and plate current from a source as battery 7. Condensers 8 and 9 are inserted in the input circuit 5 in order to prevent any D. C. voltages which may be present in voltages applied to the terminals of the input from reaching the grid. The presence of such D. C. voltages on the grid would bias the instrument and make its readings meaningless. The insulation of the input circuit for D. C. by the blocking condensers permits connection of the voltage measuring system directly to the system the voltages of which are to be measured, even though D. C. voltages may be present. At the same time, the said blocking condensers in the input circuit permit the insertion of a "C," or grid biasing battery 10, across the input circuit, and therefore of an adjustment of the tube to its maximum sensibility regardless of the characteristics of the circuit to which the instrument is to be connected. The insulating condenser 9 on the low side of the input circuit may be omitted when the low potential side of the input circuit is connected to a point in the system to be measured which is substantially at ground, or at the same potential as the filament 4.

Biasing battery 10 is connected in series with an impedance element 11. In the present embodiment this element is shown as a non-inductive resistance. However, said impedance element may be in some instances preferably a high inductance, particularly where the system is used for the measurement of voltages of voice frequency. A potentiometer 12, for close adjustment of the grid voltage is connected across the "A" or filament battery 6. The contactor arm of potentiometer 12 is in service with the "C" or biasing battery voltage,—that is, the grid to filament return is through resistance 11, "C" battery 10 and potentiometer 12.

Plate battery 7 is in series with an indicating device, milliammeter 13. A condenser 14 is connected across the plate-filament circuit, shunting the milliammeter, and a non-inductive resistance 15 is connected in series with the milliammeter and the plate battery. Resistance 15 is of high value as compared with the reactance of meter 13 and the reactance of capacity 14 is small as compared with the resistance 15, to make the plate circuit impedance substantially independent of frequency. A potentiometer 16, for close adjustment of the plate voltage, is connected across the "A" or filament battery 6. Further means for determining the calibration plate voltage include a switch means 17. This switch is arranged to close a circuit including the series of elements, potentiometer 16, plate battery 7, meter 13 and resistance 15, either through plate 3, across the gap in the tube and through filament 4, or through a resistance 18. For example with the switch in the upper position the circuit is: battery 7, meter 13, resistance 15, switch 17, plate 3, across the gap in the tube to filament 4, potentiometer 16. With the switch in the lower position the circuit is: battery 7, meter 13, resistance 15, resistance 18, potentiometer 16. In one position of the switch, therefore, the tube is included in the series, and the circuit is the actual plate-filament circuit of the system. In the other switch position, the tube is cut out and an outside resistance (18) is inserted in place of the tube. The value of the outside resistance 18 is exactly the value predetermined as that of the internal resistance of the tube between the plate and filament when a predetermined calibration "B" or plate battery voltage was applied to the plate and a predetermined calibration "C" or biasing voltage was applied to the grid. With the switch in the lower position, resistance 18, equal to the predetermined calibration plate-filament resistance of the tube, is seen to be included in what may be called a dummy plate circuit.

The magnitudes of various elements in the system, found to give good results in practice, are as follows: resistance 11 in series with the "C" battery, 20,000 ohms; blocking condensers 8 and 9, 2 mfs. and 4 mfs. respectively; resistance 15 in the plate circuit, 5000 ohms; capacity 14 across plate circuit, 4 mfs.; resistance 18 in the dummy plate circuit, 113,000 ohms.

Referring to Fig. 2, connections are added to the circuits shown in Fig. 1 for the purpose of utilizing the meter 13 as a filament ammeter if desired. This is conveniently accomplished by the provision of a d. p. d. t. switch 19 connected across resistance 20, which is in series with filament 4 and "A" battery 6.

Another arrangement for utilizing the indicating device 13 of the system as a measuring means for the "A" battery circuit is shown in Fig. 3. Switch 21 is arranged in this figure to connect the meter 13 across filament 4 for the measurement of the filament voltage if desired.

In operation, referring especially to Fig. 1: since the instrument in the process of preparation for use as a measuring device is assumed to have been accurately calibrated at a predetermined value of "B" or plate voltage and of "C" or grid biasing voltage, therefore these predetermined "B" and "C" voltages must be exactly reproduced and maintained each time the instrument is to be used for the measurement of voltages impressed on the input terminals. In order to redetermine the setting of the instrument at these calibration voltages, switch 17 is first thrown to the lower position so that the plate circuit current from battery 7, instead of flowing through the usual path by way of plate and filament, is diverted through the resistance 18 comprised in the dummy plate circuit. Potentiometer 16 is then adjusted until the current flowing in the dummy plate circuit, as indicated on meter 13, is equal to that predetermined actual plate circuit current which was found to be registered on said meter during the original calibration of the instrument, and which corresponded to the calibration value of plate voltage. When this particular predetermined calibration value of current from battery 7 through resistance 18 of the dummy plate circuit is indicated by meter 13, the voltage across said resistance 18 is obviously the same as was the predetermined, or calibration voltage between plate and filament terminals. The potentiometer 16 is left at this adjustment and switch 17 is then thrown to the upper position. Resistance 18 is thereby cut out of the circuit and the actual plate circuit is closed through plate and filament of the tube. For the instrument to be ready for use, the actual plate current, as indicated by meter 13, must now be that particular plate current value which was predetermined in the process of original calibratioin of the instrument. This value will ordinarily not be indicated on the meter at this stage of the setting of the instrument for the reason that the "C" or biasing grid voltage may not be and generally will not be the same as the original calibration "C" voltage, with the result that the plate current is also not that of calibration even though the plate circuit itself has been, as described, properly adjusted for calibration by the use of potentiometer 16 and the resistance 18 of the dummy plate circuit.

In order then to bring the plate circuit to the exact predetermined calibration value, the "C" or grid bias voltage is adjusted until said exact calibration value of plate current is indicated by the meter. This adjustment of the "C" voltage is accomplished by means of the potentiometer 12. With the above adjustments of plate and grid voltages, the adjustment of the vacuum tube voltmeter is then that of original calibration and its calibration curve will be directly applicable to all readings to be taken of voltages applied to the input circuit. In order to use the instrument accurately re-calibrated as above described, for the measurement of an alternating voltage within the range of said instrument, the system supplying said voltage need only be connected to the input terminals and the value of said voltage will be accurately indicated by meter 13.

The operation of the device constructed in accordance with Fig. 2 is the same as described for Fig. 1 as to the determination of plate and grid bias voltages, the switch 19 being thrown to the left to place the meter in the plate circuit or in the dummy plate circuit, according as switch 17 is in the lower or upper position. In case it is desired, in addition, to test the filament current reading, for example when a so called constant current tube is used, this is simply accomplished by placing meter 13 across the shunt 20 which is in series with the battery 6 and filament 4. Throwing switch 19 to the right connects in the meter for this purpose. In Fig. 3 the operation is similar except that the switch 21, corresponding to switch 20 of Fig. 2, is so connected that when thrown to one position the circuits are arranged for the determination of plate and grid voltage as before described, in connection with Fig. 1, and when thrown to the other position the meter is connected for the testing of filament voltage instead of filament current, as when a so-called constant voltage tube is used.

What is claimed is:

1. In a vacuum tube voltage measuring system, an anode, a cathode, an output circuit including the cathode and anode, a voltage indicating device associated with said circuit, an impedance of predetermined calibration value adapted to be connected into said circuit in place of the anode and cathode, and means comprising the voltage indicating device and the impedance for redetermining the original calibration conditions of the system.

2. In a vacuum tube voltage measuring system, an anode, a cathode, a grid, an anode current source, anode current control means, grid biasing means, an output circuit including the anode, the cathode, the current source and the current control means, a voltage indicating device associated with the output circuit, an impedance of predetermined calibration value adapted to be connected into said circuit in place of the anode and cathode, and means comprising the voltage indicating device, the impedance, the grid biasing means and the anode current control means for redetermining the original calibration conditions of the system.

3. In a vacuum tube voltage measuring system comprising a grid circuit, a plate circuit and a voltage indicating device in said plate circuit, means including said indicating device for redetermining the original calibration grid and plate voltages of said system, said means further including a dummy plate circuit adapted to be substituted in said system for the actual plate circuit of said system and including a resistance of a predetermined calibration value.

4. In a vacuum tube voltage measuring system, an anode, a cathode, a grid, an anode current source, anode current control means, grid biasing means, an output circuit including the anode, the cathode, the current source and the current control means, a voltage indicating device associated with the output circuit, a resistance element adapted to be connected into said circuit in place of the anode and cathode, said resistance element being of a value determined by the calibration value of tube resistance between anode and cathode, and means comprising the voltage indicating device, the resistance element, the grid biasing means, and the anode current control means for redetermining the original calibration conditions of the system.

5. In a vacuum tube voltage measuring system, an anode, a cathode, a grid, an anode current source, grid biasing means, an output circuit adapted to include the anode, cathode and current source, a voltage indicating device associated with the output circuit, a resistance element having a value determined by the calibration value of tube resistance between cathode and anode, means to connect alternately the resistance element into the output circuit in place of the anode and cathode and to reconnect the anode and cathode into said circuit in place of the resistance element, means including the indicating device to adjust the current in said circuit to a predetermined calibration value when the resistance element is connected therein in place of the anode and cathode, and means including the indicating device and the grid biasing means to adjust the current in said circuit to a predetermined calibration value when the anode and cathode are reconnected therein after said circuit including the resistance and excluding the anode and cathode has been adjusted to a predetermined calibration value, whereby original calibration conditions in the system are redetermined.

6. In a vacuum tube voltage measuring system, an anode, a cathode, a grid, an anode current source, grid biasing means, a voltage indicating device, an output circuit adapted to include the anode, cathode, current source and indicating device, a resistance element having a value equal to the calibration value of tube resistance between cathode and anode, means to connect alternately the resistance element into the output circuit in place of the anode and cathode and to reconnect the anode and cathode into said circuit in place of the resistance element, means including the indicating device to adjust the current in said circuit to a predetermined calibration value when the resistance element is connected therein in place of the anode and cathode, and means including the indicating device and the grid biasing means to adjust the current in said circuit to a predetermined calibration value when the anode and cathode are reconnected therein after said circuit including the resistance and excluding the anode and cathode has been adjusted to a predetermined calibration value, whereby original calibration conditions in the system are redetermined.

In testimony whereof, I have hereunto signed my name.

LAWRENCE C. F. HORLE.